United States Patent Office.

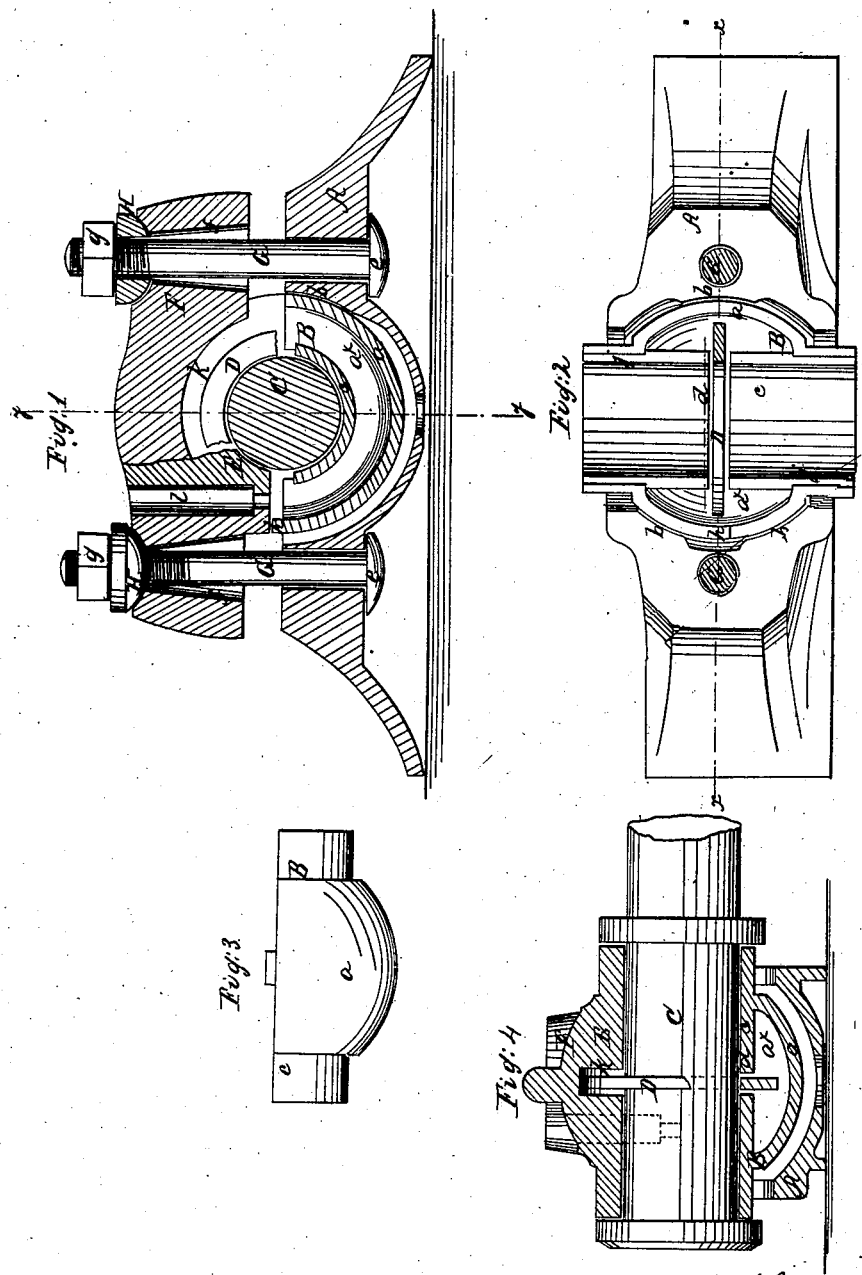

SELF-OILING AND ADJUSTING BEARING FOR MACHINERY.

THOMAS S. BROWN, OF POUGHKEEPSIE, NEW YORK, ASSIGNOR TO HIMSELF AND JOHN P. ADRIANCE, OF SAME PLACE.

Letters Patent No. 60,616, dated December 18, 1866.

---

The Schedule referred to in these Letters Patent and making part of the same.

---

TO ALL WHOM IT MAY CONCERN:

Be it known that I, THOMAS S. BROWN, of Poughkeepsie, in the county of Dutchess, and State of New York, have invented a new and improved Self-Oiling and Self-Adjusting Bearing for Machinery; and I do hereby declare that the following is a full, clear, and exact description thereof, which will enable others skilled in the art to make and use the same, reference being had to the accompanying drawings, forming part of this specification, in which—

Figure 1 is a vertical central section of my invention, taken in the line $x\ x$, fig. 2.

Figure 2, a plan or top view of the lower part of the bearing.

Figure 3, a detached front view of the lower part of the bearing.

Figure 4, a vertical longitudinal section of the whole device, taken in the line $y\ y$, fig. 1.

Similar letters of reference indicate like parts.

The object of this invention is to obtain a bearing for the shafting of machinery which will be self-lubricating and self-adjusting, that is to say, be capable of supplying the journal with oil so long as any remains within the oil chamber, and also be capable of adjusting itself in line with the shafting in case the bearings be not set perfectly in line with the shafting in adjusting machinery together. It is well known among the "fitters up" of machinery that a great deal of friction and unnecessary wear and tear are produced by the inaccurate adjustment of the bearings of shafting, and not unfrequently, even when experienced and competent men have put the parts of a machine together, the bearings will be frequently found not to be in exact line with the shafting. By my improvement this difficulty is fully obviated, by having the bearing constructed in such a manner as to be capable after being set or secured to the framing of the machine to adjust itself in line with the shafting, if in the least out of line therewith.

A represents what may be termed the bed or socket in which the lower part, B, of the bearing is fitted. This bed or socket is of cast metal, and has a recess in which B is fitted, the exterior of B being a portion of a sphere, as shown at $a$, and having three bearing surfaces, $b$, in the socket A, which surfaces also form portions of one and the same sphere. This arrangement it will be seen is substantially the same as a ball and socket joint, the lower portion, B, of the bearing being allowed to turn and adjust itself freely in A, in any direction. Within the part, B, there is a semi-cylindrical shell, $c$, cast with B, to receive the journal C, the space $a^*$, between B and $c$, constituting an oil chamber. The shell, $c$, has a groove or slot, $d$, made entirely across it, to receive a ring, D, which is fitted loosely on the journal, C, and extends into the oil chamber, $a^*$. The upper part, E, of the bearing is a semi-cylindrical shell, which is fitted on the shell, $c$, and, in this instance, is cast with a plate, F, to form a cap through which the bolts, G G, pass to secure the two parts of the bearing together, said bolts passing loosely through the socket, A, and having heads, $e$, on their lower ends, and extending up through conical holes, $f$, in the plate F, see fig. 1, the upper ends of the holes, $f$, being reamed out or cast to form a portion of a hollow sphere, and receive washers, H, on the bolts, G, the lower surfaces of the washers being made to form a portion of a sphere to work in the upper ends or orifices of the holes, $f$, nuts, $g$, being screwed on the rods of the bolts, and bearing upon the washers, H. The upper part, E, of the bearing is prevented from sliding on the lower part in a longitudinal direction by means of a lip, $h$, on one edge of B, fitting in a recess in one edge of E, and the two parts, B E, are prevented from slipping or sliding laterally by having the adjoining edges of the parts, $c$ E, fitted together by a rebated joint, the rebates of the part $c$ being shown in fig. 2, and designated by $j$. The upper part, E, of the bearing is grooved transversely, as shown at $k$, to receive the upper part of the ring, D, and a hole, $l$, is made or cast in F, to form a passage to the oil chamber, $a^*$, as shown in fig. 1.

From the above description it will be seen that when the bed or socket, A, is secured in position, and the plate, F, secured to the bed or socket by the bolts, G, that the shaft will be allowed to adjust itself in line with the bearing, as the shell, $c$, is allowed to turn in any direction to a certain extent, and the upper part, E, will follow $c$, as the plate F is allowed to move or adjust itself on account of the bolts, G, being allowed to play in their conical holes, $f$, and the washers, H, allowed to turn and adjust themselves in the spherical orifices of the holes, $f$. The journal is kept in a perfectly lubricated state by the ring D, which turns with the journal, and raises oil upon the upper part of the same from the chamber $a^*$. I would remark, that if necessary or desired, the upper part, E, of the bearing may be cast with a portion of a sphere and separate from the plate F, and fitted in F like B is fitted in A. This would admit of F being firmly bolted to A, and allow the two parts, E c, to turn or adjust themselves without any movement of F, but in practice I think that by means of the play allowed, the bolts G F may be allowed to move sufficiently to admit of the journal C adjusting itself as much as may be necessary.

Having thus described my invention, I claim as new, and desire to secure by Letters Patent, is—

The combination of the bed A, part B, with its bearing surfaces as described, and lip $h$, the slotted shell $c$, cast with part B, forming the oil chamber $a^*$, the grooved part E, slotted caps F, and semi-spherical washers H, arranged with the journal C, provided with the ring D, substantially as and for the purpose specified.

THOS. S. BROWN.

Witnesses:
ROBT. N. PALMER,
HENRY R. HOWARD.